March 22, 1932.  C. T. HATCH  1,850,837
COATING MACHINE
Filed Sept. 15, 1928  4 Sheets-Sheet 1

INVENTOR
Charles T. Hatch
BY Chappell & Earl
ATTORNEYS

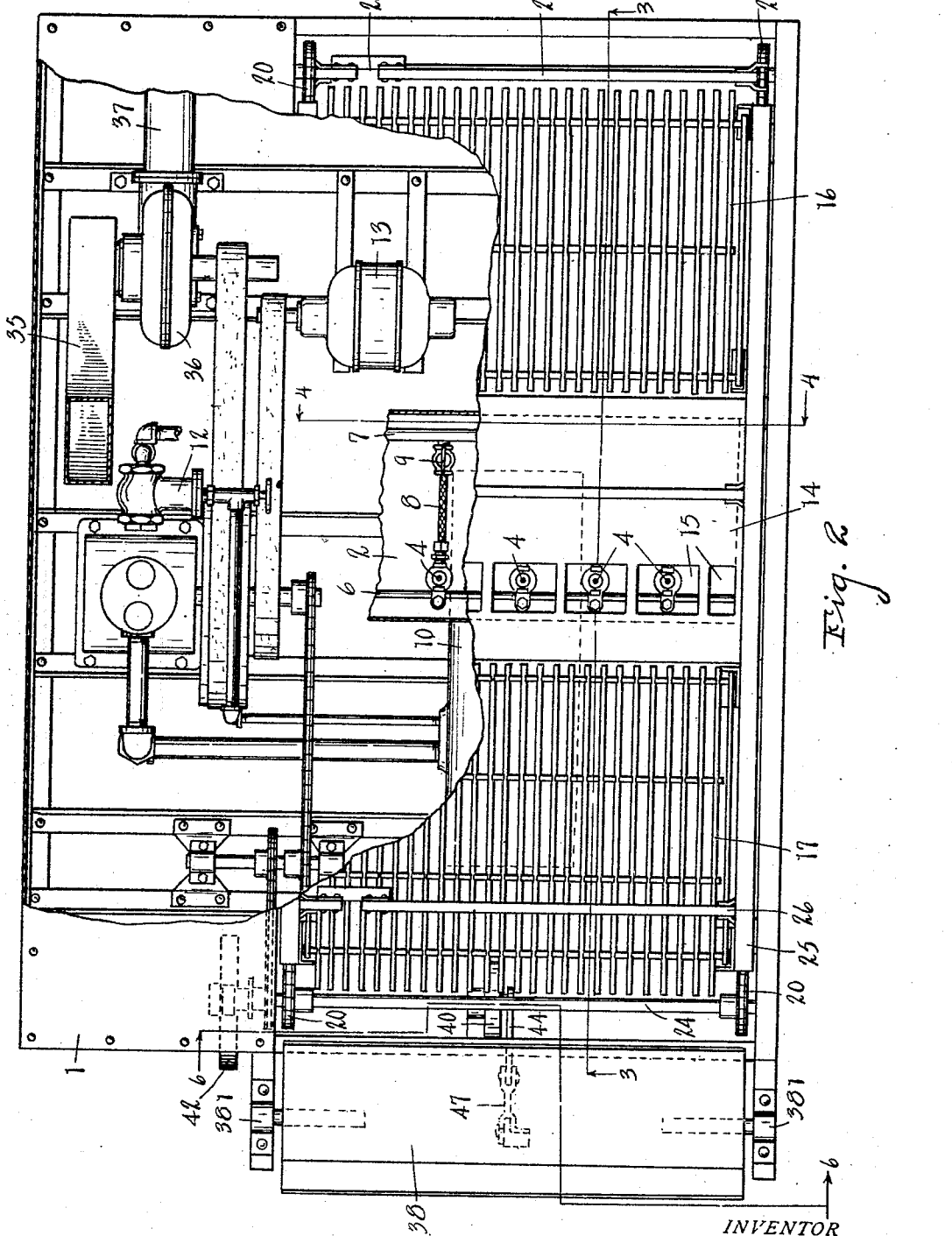

March 22, 1932. C. T. HATCH 1,850,837
COATING MACHINE
Filed Sept. 15, 1928 4 Sheets-Sheet 3
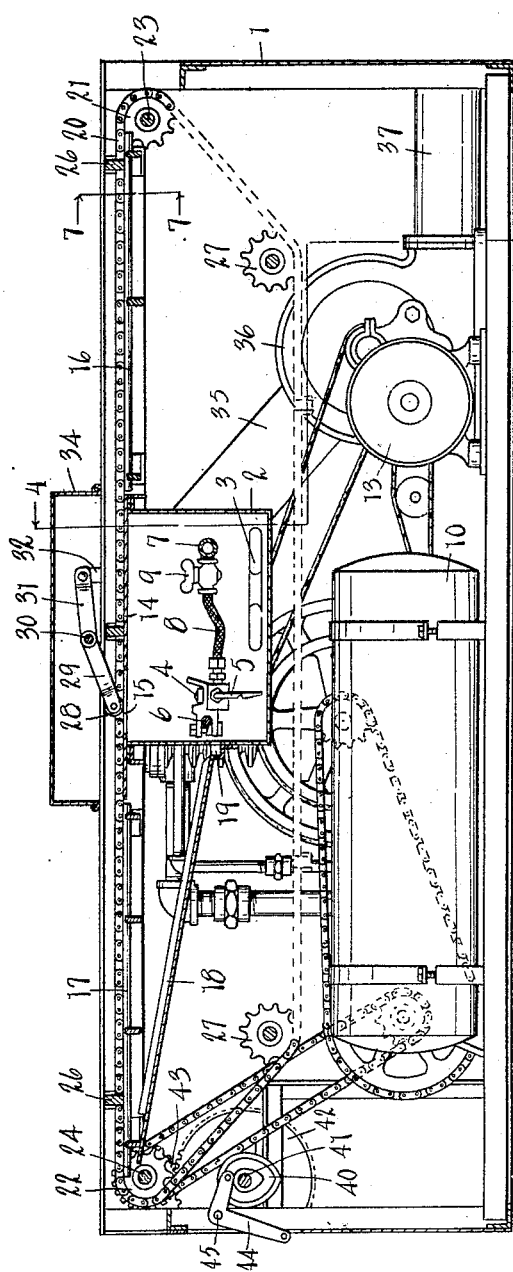
INVENTOR
Charles T. Hatch
BY Chappell & Earl
ATTORNEYS Patented Mar. 22, 1932

1,850,837

UNITED STATES PATENT OFFICE

CHARLES T. HATCH, OF ALBION, MICHIGAN, ASSIGNOR TO UNION STEEL PRODUCTS COMPANY, OF ALBION, MICHIGAN

COATING MACHINE

Application filed September 15, 1928. Serial No. 306,252.

The main object of this invention is to provide a coating machine which is well adapted for the greasing of baking pans, the same being adapted to handle large pans and effectively coat the same without injury to or distortion of the pans.

A further object is to provide a machine of this character which is automatic in its operation.

Objects relating to details and economies of my invention will appear from the description to follow. The invention is defined and pointed out in the claims.

A structure which is a preferred embodiment of my invention is illustrated in the accompanying drawings, in which:

Fig. 2 is a fragmentary plan view.

Fig. 3 is a detail view mainly in vertical section on line 3—3 of Figs. 1, 2 and 4.

Fig. 7 is an enlarged detail section on line 7—7 of Fig. 3.

Fig. 8 is a detail section corresponding to that of Fig. 5 of a modified form or embodiment of my pan reversing means.

In the drawings similar reference characters refer to similar parts through the several views.

Figure 1:
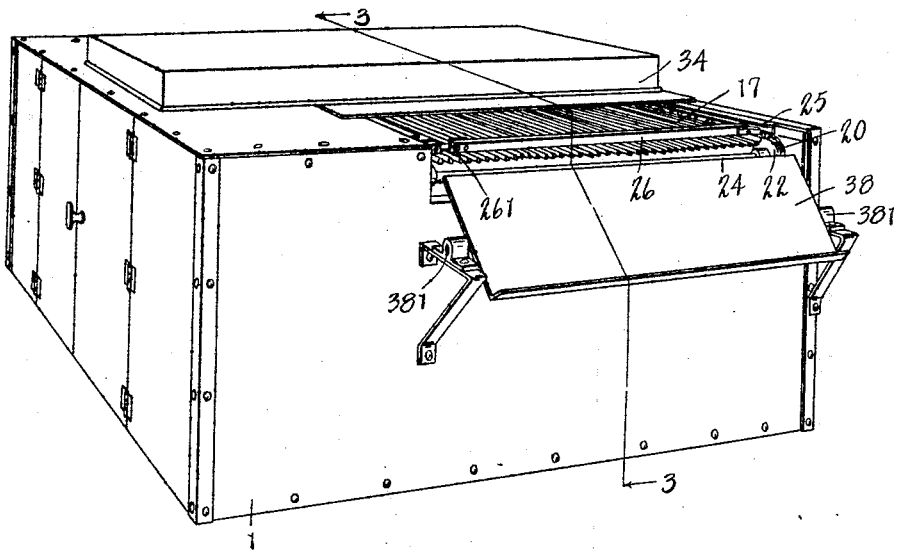
Fig. 1 is a rear perspective view of my improved coating machine.
Figure 4:
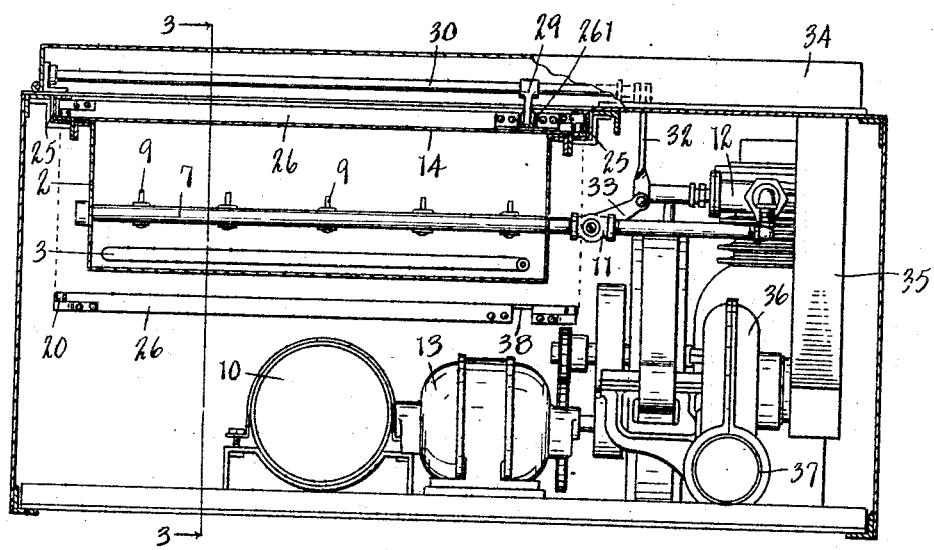
Fig. 4 is a detail view partially in transverse section on line 4—4 of Figs. 2 and 3.
Figure 5:
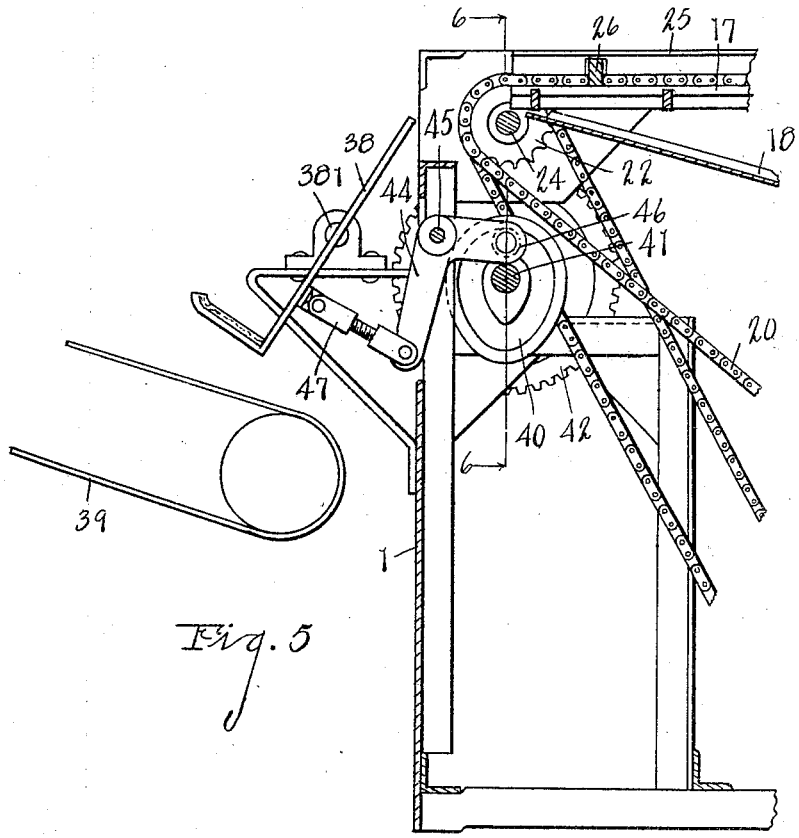
Fig. 5 is a detail view partially in vertical section on line 5—5 of Fig. 6.
Figure 6:
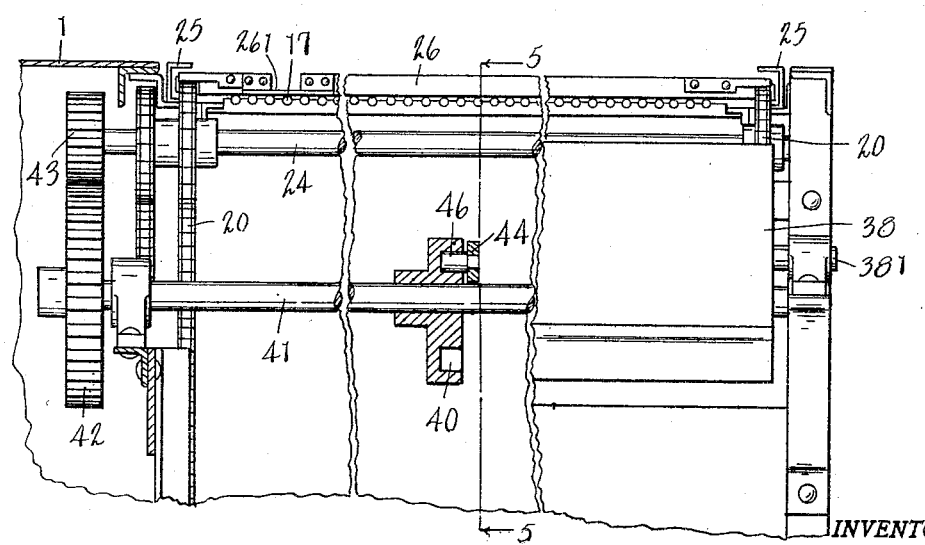
Fig. 6 is a fragmentary view partially in section on line 6—6 of Fig. 2.

Referring to the drawings, I provide a housing 1 of such dimensions as to enclose most of the operating parts. Within this housing I mount a tank 2 for the coating material such as lard, a heating coil 3 being provided for the tank.

Within the tank, I mount a plurality of spray nozzles 4, these nozzles having liquid intakes 5 depending into the tank. The nozzles 4 are adjustably mounted on a rod 6 so that their spacing may be regulated. An air pipe 7 is connected to the nozzles by means of the flexible conduit 8. These conduits are provided with valves 9 so that certain of them may be entirely cut off or the amount of air delivered regulated. The connection for this pipe 7 to the supply tank 10 is controlled by the valve 11. A pressure regulating valve 12 is arranged in this connection— see Fig. 2.

The details of the driving connection from the motor 13 to the compressor form no part of this invention.

I provide a conveyor for conveying pans across the tank, this conveyor consisting of a plate-like member 14 constituting a top for the tank and having openings 15 therein above the spray nozzles.

A grid-like receiving way member 16 is disposed in front of the way member 14 so that the pans may be laid thereon to be picked up by the conveyor flights.

At the rear of the way member 14 is a gridlike discharge member 17 below which is a drain or drip board 18 delivering through openings 19 to the tank.

The conveyor chains 20 are supported by sprockets 21 and 22 on the shafts 23 and 24 respectively, these shafts being arranged at the end of the conveyor way so that the upper reach of the sprocket chains are in a horizontal position, these being supported by the tracks 25 disposed at the sides of the way—see Fig. 7.

The flights 26 are secured to the conveyor chains in suitably spaced relation to extend across the conveyor way. The tracks 25 support the conveyor chains so that the flights do not slide upon the conveyor way but are carried along above it. Guide sprockets 27 are provided for the lower reach of the conveyor chains.

The shaft 24 is provided with suitable driving connections to the motor.

As the pans are carried along above the spraying apparatus, the valve 11 is opened and retained open thereby, the pans engaging the roller 28 on the arm 29 of the rockshaft 30 disposed above the spraying apparatus. This rockshaft has an arm 31 connected by the link 32 to the valve lever or arm 33 so that the valve is opened as the forward edge of the chain passes over the spray nozzles and held open until the rear edge of the pan passes the spray nozzles.

A hood 34 is arranged above the spray nozzles. An exhaust conduit 35 opens into this hood, this conduit being connected to the blower 36 having a discharge 37.

The valves are actuated only when the pans are in position to be sprayed, the flights being recessed at 261 so that they do not open the valves.

The pans are discharged from the coating conveyor to an L-shaped reversing member 38 which is pivoted at 381 to receive the pans in an inverted position. This reversing member discharges the pans in an upright position to the discharge conveyor 39.

To actuate and time the reversing member, I provide a heart-shaped grooved cam 40 which is mounted on a shaft 41 connected by the gears 42 and 43 to the driven conveyor shaft 24.

The bell crank lever 44 is pivoted at 45, one arm being provided with a roller 46 engaging the cam, the other being connected by the link 47 to the reversing member.

In the modification shown in Fig. 8, the reversing member 48 is pivoted at 49 and connected by the link 50 to the arm 51 pivoted at 52 on the frame so that the arm is engaged by the flights of the conveyor and the reversing member thereby actuated to reverse the pans and discharge them in upright position on the discharge conveyor.

My improved coating machine is of very large capacity and capable of handling large pans with a minimum of effort and handling on the part of the operator.

The structure is also economical in the matter of coating material as the spraying apparatus is in action only while the pans are in position to be coated.

I have illustrated and described my improvements in an embodiment which I have found very satisfactory. I have not attempted to illustrate and describe other adaptations or embodiments as it is believed this disclosure will enable those skilled in the art to embody or adapt my improvements as may be desired.

Having thus described my invention, what I claim as new and desire to secure by Letters Patent, is:

1. In a coating machine, the combination with a tank, of a plurality of spray nozzles mounted within and provided with liquid intakes depending into said tank, an air supply valve for said nozzles, a conveyor comprising a plate-like way member constituting a top for said tank and having openings therein above said spray nozzles, grid-like receiving and discharge conveyor way members disposed at the front and rear of said tank, a drain board disposed below the discharge member of said conveyor way and delivering to said tank, sprocket chains and coacting sprockets, bar-like flights secured to said sprocket chains to extend across said conveyor way, supporting tracks for the upper reaches of said chains whereby said flights are supported out of contact with said conveyor way, a rockshaft disposed transversely above said conveyor, an arm on said rockshaft adapted to be engaged by a pan carried along said conveyor way by said conveyor flights, said flights being notched to receive said arm, and operating connections from said rockshaft to said supply valve.

2. In a coating machine, the combination with a tank, of a plurality of spray nozzles mounted within and provided with liquid intakes depending into said tank, an air supply valve for said nozzles, a conveyor way constituting a top for said tank and having openings therein above said spray nozzles, sprocket chains and coacting sprockets, bar-like flights secured to said sprocket chains to extend across said conveyor way, supporting tracks for the upper reaches of said chains whereby said flights are supported out of contact with said conveyor way, a rockshaft disposed transversely above said conveyor, an arm on said rockshaft adapted to be engaged by a pan carried along said conveyor way by said conveyor flights, said flights being notched to receive said arm, and operating connections from said rockshaft to said supply valve.

3. In a coating machine, the combination with a tank, of a plurality of spray nozzles provided with liquid intakes depending into said tank, an air supply valve for said nozzles, a conveyor way member constituting a top for said tank and having openings therein above said spray nozzles, a grid-like discharge way member disposed at the rear of said tank, a pair of sprocket chains and coacting sprockets, flights secured to said sprocket chains to extend across the conveyor way, and means for operating said air valve comprising an arm positioned to be engaged by pans as they are carried along said conveyor way, said flights being notched to receive said arm whereby the valve is actuated only by the pans.

4. In a coating machine, the combination with a tank, of a plurality of spray nozzles provided with liquid intakes depending into said tank, an air supply valve for said nozzles, a conveyor way member constituting a top for said tank and having openings therein above said spray nozzles, a grid-like discharge way member disposed at the rear of said tank, a pair of sprocket chains and coacting sprockets, flights secured to said sprocket chains to extend across the conveyor way, and means for operating said air valve comprising an arm positioned to be engaged by pans as they are carried along said conveyor way.

5. In a coating machine, the combination with a tank, of a plurality of spray nozzles provided with liquid intakes depending into said tank, an air supply valve for said nozzles, a conveyor way member constituting a top for said tank and having openings therein above said spray nozzles, a grid-like discharge way member disposed at the rear of said tank, a drain board disposed below the discharge member of said conveyor way and delivering to said tank, a pair of sprocket chains and coacting sprockets, flights secured to said sprocket chains to extend across the conveyor way, and means for operating said air valve comprising an arm positioned to be engaged by pans as they are carried along said conveyor way.

6. In a coating machine, the combination with a tank, of a plurality of spray nozzles mounted within and provided with liquid intakes depending into said tank, an air supply valve for said nozzles, a conveyor way extending over said tank, a drain board disposed below the rear portion of said conveyor way and delivering to said tank, sprocket chains and coacting sprockets, pan propelling flights on said sprocket chains, a rockshaft disposed transversely above said conveyor, an arm on said rockshaft positioned to be engaged by a pan carried along said conveyor way by said conveyor flights, and operating connections from said rockshaft to said air supply valve.

7. In a structure of the class described, the combination with a tank, of a spraying apparatus disposed within said tank, a coating conveyor for conveying pans in an inverted position across said tank, a discharge conveyor, an L-shaped reversing member to which the pans are delivered in an inverted position from said conveyor pivotally mounted at the rear of said coating conveyor, a cam having driving connections to said coating conveyor, a bell crank lever, one arm of which is operatively associated with said cam, and a link connecting the other arm of said lever to said reversing member whereby the pans discharged from said coating conveyor to said reversing member are automatically inverted thereby and delivered to said discharge conveyor in upright position.

8. In a structure of the class described, the combination of a spraying apparatus, a coating conveyor for conveying pans in an inverted position across said spraying apparatus, a discharge conveyor, a pivotally mounted reversing member to which the pans are delivered in an inverted position from said coating conveyor, a cam having driving connections to said coating conveyor, a bell crank lever, one arm of which is operatively associated with said cam, and a link connecting the other arm of said lever to said reversing member whereby the pans discharged from said coating conveyor to said reversing member are automatically inverted thereby and delivered to said discharge conveyor in upright position.

9. In a structure of the class described, the combination of a spraying apparatus, a coating conveyor for conveying pans in an inverted position across said spraying apparatus, a pivotally mounted reversing member to which the pans are delivered in an inverted position from said coating conveyor, a cam having driving connections to said coating conveyor, a bell crank lever, one arm of which is operatively associated with said cam, and a link connecting the other arm of said lever to said reversing member whereby the pans discharged from said coating conveyor to said reversing member are automatically inverted.

10. In a structure of the class described, the combination with a tank, of a spraying apparatus disposed within said tank, a driven coating conveyor for conveying pans in an inverted position across said tank, a discharge conveyor, an L-shaped reversing member to which the pans are delivered in an inverted position from said coating conveyor pivotally mounted at the rear thereof to discharge to said discharge conveyor, and means for actuating said reversing member on its pivot driven by said coating conveyor whereby its actuation is timed.

11. In a structure of the class described, the combination of a spraying apparatus, a driven coating conveyor for conveying pans in an inverted position across said spraying apparatus, a discharge conveyor, a movably mounted reversing member to which the pans are delivered in an inverted position from said coating conveyor to discharge to said discharge conveyor, and means for actuating said reversing member driven by said coating conveyor.

12. In a structure of the class described, the combination of a spraying apparatus, a driven coating conveyor for conveying pans in an inverted position across said spraying apparatus, a movably mounted reversing member to which the pans are delivered in an inverted position from said coating conveyor, and means for actuating said reversing member driven by said coating conveyor.

In witness whereof I have hereunto set my hand.

CHARLES T. HATCH.